United States Patent [19]

Reaume

[11] Patent Number: 4,519,459
[45] Date of Patent: May 28, 1985

[54] POWER DRIVE REAR TINE TILLER WITH REVERSING GEAR TRANSMISSION FOR THE TINES

[75] Inventor: Leonard V. Reaume, Natchez Trace Village, Miss.

[73] Assignee: Magna American Corporation, Raymond, Miss.

[21] Appl. No.: 480,709

[22] Filed: Mar. 31, 1983

[51] Int. Cl.$^3$ .............................. A01B 33/02
[52] U.S. Cl. ..................... 172/42; 172/125; 74/377; 192/21
[58] Field of Search ............ 172/42, 43, 125; 180/19 RS; 192/21; 74/377

[56] References Cited

U.S. PATENT DOCUMENTS

| | | | |
|---|---|---|---|
| 1,402,839 | 1/1922 | Coffey | 192/67 P |
| 1,757,026 | 5/1930 | Tuttle | 74/377 |
| 1,892,485 | 12/1932 | Dufour | 172/125 X |
| 2,109,290 | 2/1938 | Heckman | 74/377 |
| 2,903,077 | 9/1959 | Kamlukin | 172/42 |
| 2,943,687 | 7/1960 | Merry | 172/43 X |
| 3,180,428 | 4/1965 | Price | 172/42 |
| 3,442,335 | 5/1969 | Silbereis | 172/125 |
| 4,237,983 | 12/1980 | Allen | 172/42 |
| 4,286,670 | 9/1981 | Ackerman | 172/42 |
| 4,321,969 | 3/1982 | Wilson | 172/42 |

FOREIGN PATENT DOCUMENTS

| | | | |
|---|---|---|---|
| 957697 | 2/1957 | Fed. Rep. of Germany | 172/42 |
| 1024739 | 2/1958 | Fed. Rep. of Germany | 172/125 |
| 536411 | 12/1955 | Italy | 74/377 |
| 182307 | 2/1936 | Switzerland | 172/42 |
| 528807 | 11/1940 | United Kingdom | 172/43 |

Primary Examiner—Richard J. Johnson
Attorney, Agent, or Firm—Frost & Jacobs

[57] ABSTRACT

An engine, through a suitable transmission, drives the traction wheels of a garden tiller in a forward direction. The engine also drives the tine shaft and tines through another transmission and a differential. The second transmission contains a gear arrangement by which the tine shaft may be rotated in the same direction as the traction wheels at one time, and in an opposite direction at another time, a neutral position also being provided. The second transmission includes a splined shaft which drivingly engages a gear which is slidable thereon. An output gear is provided in this second transmission and it may be drivingly connected to the slidable gear for rotation in a given direction by means of a plurality of pins carried on the output gear and received within appropriate holes provided in the slidable gear.

Right and left cluster gears are mounted on a common shaft. A gear idler is mounted on yet another shaft and this gear idler constantly meshes with the output gear and with the right hand cluster gear. The slidable gear may be slid to a neutral position wherein it no longer engages the pins and wherein it does not engage the left hand cluster gear. The slidable gear may be moved to a further position where it engages the left hand cluster gear. This latter position results in the output gear being driven in the opposite direction via the splined shaft, the slidable gear, the left hand cluster gear, the right hand cluster gear and the gear idler.

3 Claims, 6 Drawing Figures

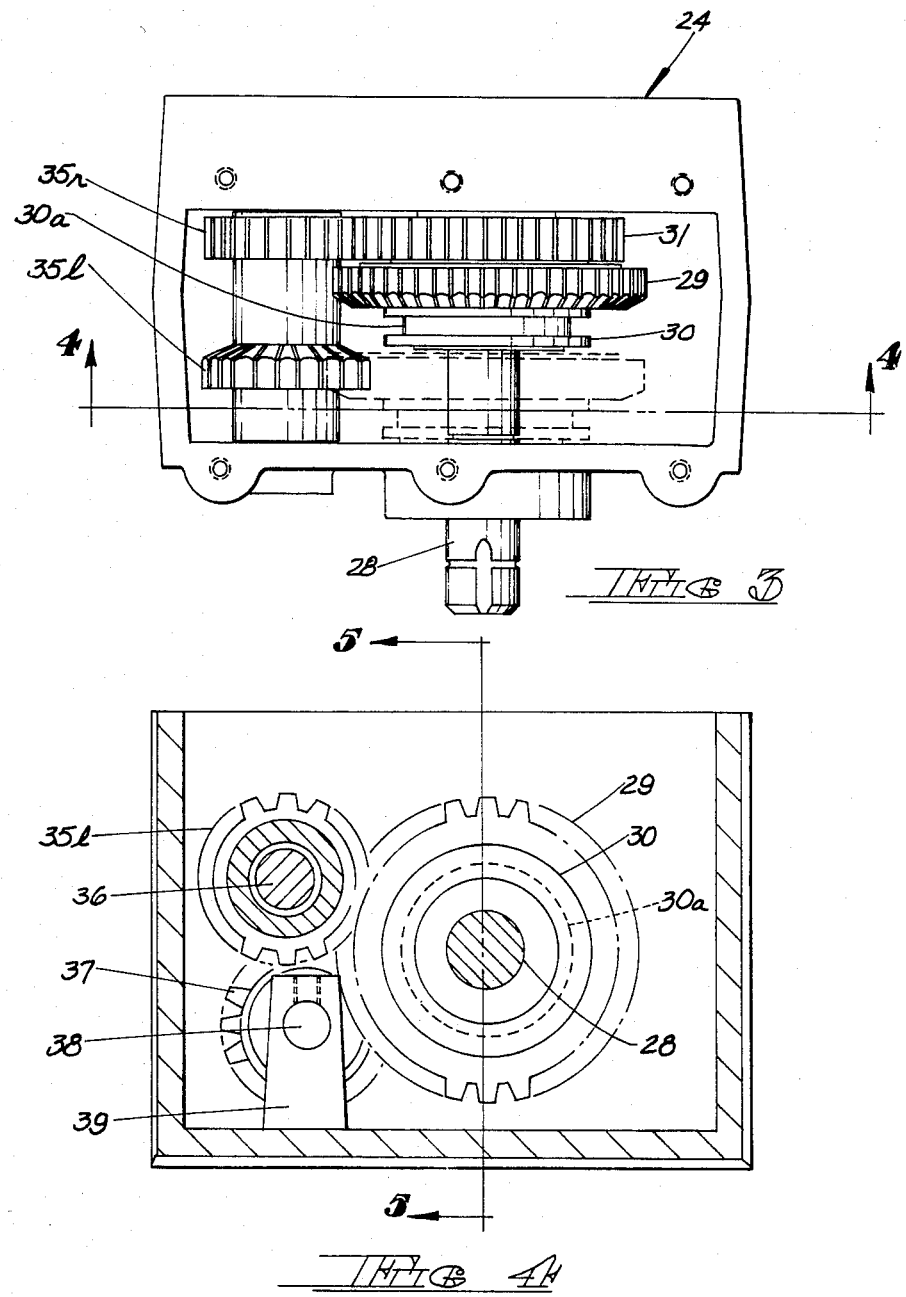

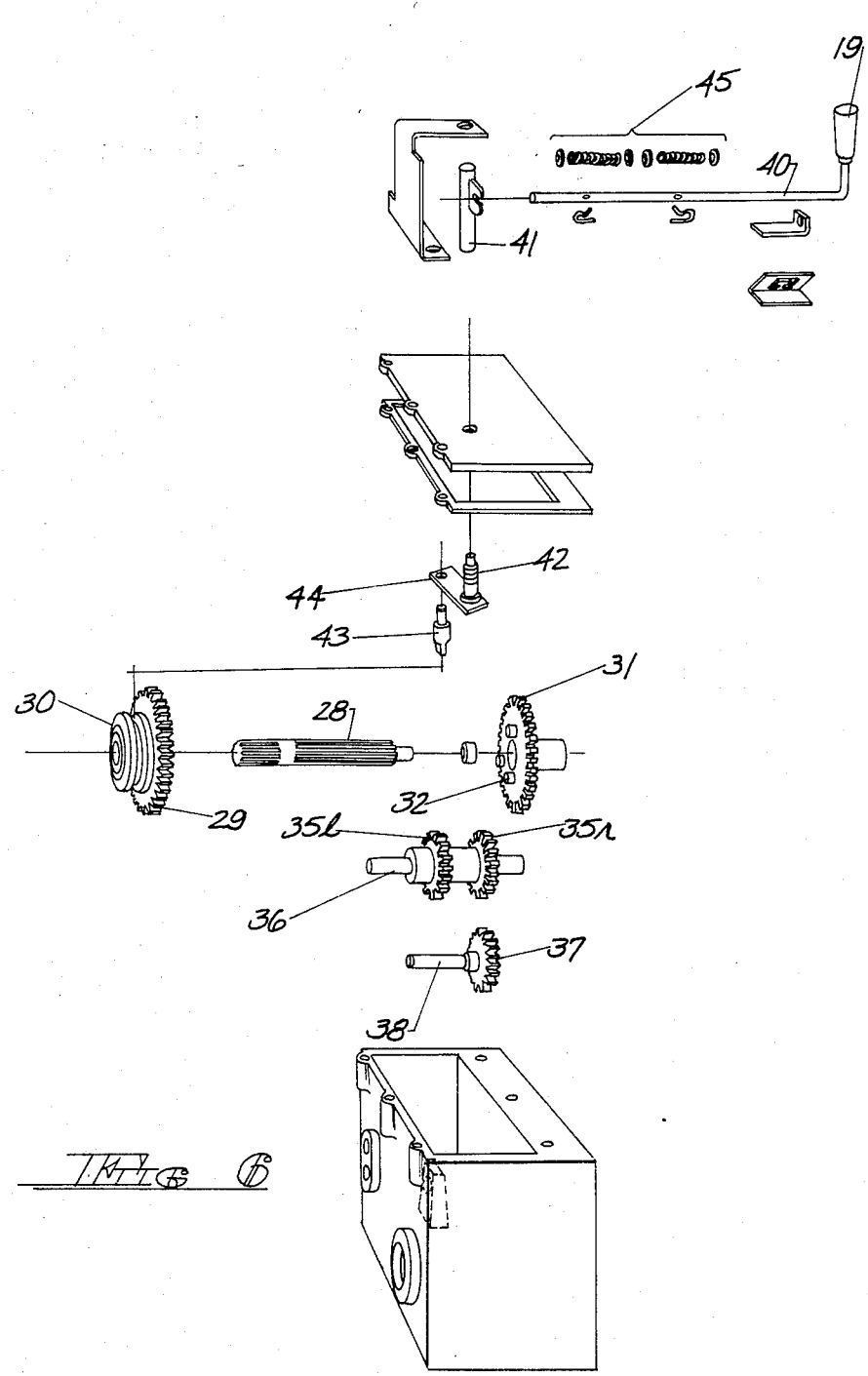

POWER DRIVE REAR TINE TILLER WITH REVERSING GEAR TRANSMISSION FOR THE TINES

TECHNICAL FIELD

This invention relates to home garden tillers having power driven wheels and power driven tines, the tines being located between the wheels and the operator. The operator guides the tiller via appropriate handles while the wheels propel the tiller in a forward direction. The tines may also be driven in the same, forward direction. It is known, however, to provide tillers wherein the wheels operate in a forward direction and the tines in a rearward, opposite direction.

Thus, in a "standard" tiller both the wheels and the tines rotate in the same direction to propel the tiller forwardly. Such a tiller will do a good job in previously tilled soil or in light sandy soil. In hard soil, however, the tines tend to skip and till only to a very shallow depth. As indicated "counter-rotating" tillers are also known wherein the power driven wheels propel the tiller forwardly while the power driven tines are rotated in an opposite direction. This arrangement has the advantage of enabling the tines to penetrate to a deep depth even in hard soil; in light sandy soil, or previously tilled soil, however, the tines in this "counter-rotating" arrangement tend to overpower the wheels and make it necessary for the operator to exert considerable effort to shove the machine forwardly.

The power driven rear tine tiller with reversing gear transmission for the tines of this invention enables the tiller to be operated either in a "standard" manner or in a "counter-rotating" manner so as to obtain the best features of both types. The conversion is achieved through a reversing transmission gear assembly.

BACKGROUND ART

A search of the United States patent art was conducted in an effort to develop the most pertinent prior art relating to this invention. The principal patents developed by that search are discussed briefly below. No assertion is made, however, that the best prior art was developed by that search although that was indeed the intent of the search. The pertinent patents developed are listed as follows: U.S. Pat. Nos. 2,903,077 Kamlukin; 2,943,687 Merry et al; 3,180,428 Price; 3,442,335 Silbereis et al; 4,237,983 Allen; 4,286,670 Ackerman; 4,321,969 Wilson.

U.S. Pat. No. 2,903,077 to Kamlukin describes a reversing transmission means by which the rotor of the tiller may be driven in either a forward or reaaward direction. The transmission means features a reversing belt arrangement which is adapted to connect the rotor with the engine. A belt tightening device selectively tightens either a forward belt or a reverse belt so as to govern the rotational direction of the rotor.

U.S. Pat. No. 2,943,687 to Merry et al teaches a reversible earthworking tiller. When the tines are to rotate in a forward direction, the transmission case is moved to a forward position on the frame. Similarly, when the tine rotation is to be reversed, the transmission case is moved to a rearward position on the frame.

U.S. Pat. No. 3,180,428 to Price teaches a rotating tiller device with a drag bar system which can be maintained in its effective position regardless of the direction in which the device moves. A rotor with tines can rotate in either a forward or a rearward direction. A drive belt assembly links the output of the internal combustion engine with the rotor to govern the rotational direction of such rotor.

U.S. Pat. No. 3,442,335 to Silbereis et al discloses a soil tilling device having a transmission unit capable of reversing the rotation of the tines. By properly moving a hand lever and knob the actuator is positioned so as to cause either a forward or a rearward rotation of the tines.

U.S. Pat. No. 4,237,983 to Allen teaches a reversible power transmission which rotates the tines in a particular angular direction. The drive assembly has two power take-off assemblies each with an independent clutch. By selectively actuating the clutches, the desired rotation of the tines can be obtained.

U.S. Pat. No. 4,286,670 to Ackerman discloses a combination tiller and cultivator with a drive control mechanism capable of reversing the rotational direction of the tines. The handle is movable between the front and rear portions of the tiller. The reversible power transmission connects the engine to the wheels and tines so as to govern the direction of their rotation.

U.S. Pat. No. 4,321,969 to Wilson teaches a garden cultivator having tines rotatable in a forward and rearward direction. A forward drive belt mechanism and a reversible belt drive mechanism govern the directions of the tine rotation.

From the foregoing review of the patents developed in the search it would appear that the general concept of having tines on a tiller capable of both forward and rearward rotation is not new, particularly when belt drives are employed. Such patents, however, do not seem to teach or suggest an arrangement in which the tiller is positively driven in a forwardly direction while the tines are driven either in the same, forward direction or in an opposite, rearward direction. In the tillers of the search developed patents, for the most part the tillers moved in the direction of the tine rotation, i.e., when the tines rotated forwardly the tiller moved forwardly and when the tines rotated rearwardly the tiller moved rearwardly. Such tillers converted the tines from a forward to a rearward rotation so that the tiller could move backwards.

DISCLOSURE OF THE INVENTION

In the instant invention the tiller is propelled forwardly by power driven traction wheels while the tines may be separately driven either in the same, forward direction or in an opposite, rearward direction, all while the tiller is moved in a forward direction. A neutral position for the tine rotation is also provided.

Rear tine tillers with conventional tine rotatiom (forward rotation) have both the traction wheels and tines rotating in the same direction. The rotational speed of the wheels is selected to provide a normal forward speed of approximately 0.8 miles per hour. The rotational speed of the tines is much higher, normally around 200 RPM. When attempting to till in new unbroken soil or hard crusty previously tilled soil, the traction of the tines is much greater than the traction of the wheels, and the rotational movement of the tines overrides the wheels causing the machine to advance in leaps and bounds in an uncontrollable attitude. As a result of the above problem, it is necessary, when breaking ground, to go over the area several times, starting with approximately 1" of depth the first pass and increasing the depth a small amount each succeeding pass.

Once the soil in the garden area is tilled to the proper depth, the conventional rotation rear tine tiller does a satisfactory job of tilling in mulch, furrowing (with attachments) and cultivating.

Rear tine tillers with counter-rotating tines have the tines rotating in the opposite direction from the traction wheels and the traction caused by the tines cutting through the soil is opposed to the pulling traction of the wheels. Using the counter-rotating principle, unbroken or previously tilled hard crusted soil can be tilled to full depth with one pass and the action of the machine is extremely smooth and even with no tendency to lunge or jump forward.

The counter-rotating tine tiller overcomes the major problems of the conventional rotation rear tine tiller. It is not, however, the complete answer in all types and conditions of soil. In extremely sandy light soil or finely pulverized soil, the traction of the drive wheels is not enough to effectively pull the tiller forward at the proper rate, and in extremely rocky soil the action of the tines may throw the rocks up and forward and present a problem of rocks wedging between the tines and main chassis or between the tines and the tine cover.

The concept of the power driven rear tine tiller with reversing gear transmission for the tines, of this invention, is to allow the operator to switch the tine action from conventional (forward—in the same direction as the power driven traction wheels) rotation to counter (rearward—in the opposite direction as the power driven traction wheels) rotation to suit the particular soil conditions and/or gardening task at hand. The invention utilizes aa gear box or reversing transmission gear assembly to enable the operator to make the switch readily as desired.

BRIEF DESCRIPTION OF THE DRAWINGS

FIG. 3 is a top view of the tine transmission, the top plate being removed, the solid line position illustrating one direction of tine movement and the dotted line position illustrating the opposite direction of tine movement.

FIG. 4 is a section taken on the line 4—4 of FIG. 3.

FIG. 6 is an exploded, partially schematic and partially diagrammatic, view showing the reversing transmission assembly and its method of operation.

DETAILED DESCRIPTION OF THE INVENTION

Figure 1:
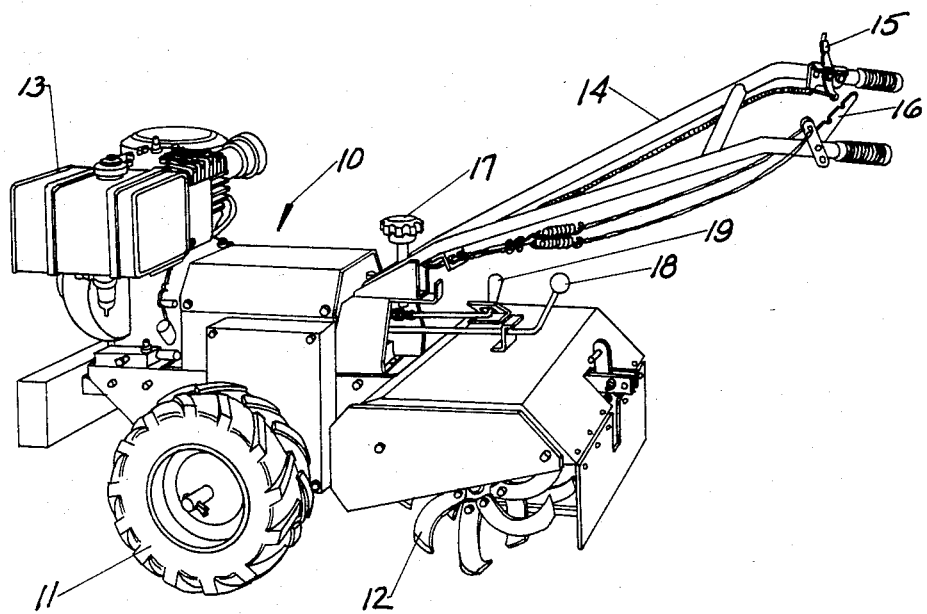
FIG. 1 is a perspective view of a conventional garden tiller in which the instant invention has been incorporated.

Referring first to FIG. 1, an illustrative garden tiller is generally depicted at 10 and is shown as including traction wheels 11, tines 12 and an engine 13. The tiller is guided by an operator via a pair of handles 14 having a throttle control 15 and clutch lever 16, a hand knob 17 for handle bar release also being provided. Rotation of the traction wheels 11 may also be governed by the lever mechanism 18 while rotation of the tines 12 may be regulated through the spring biased lever mechanism 19.

Figure 2:
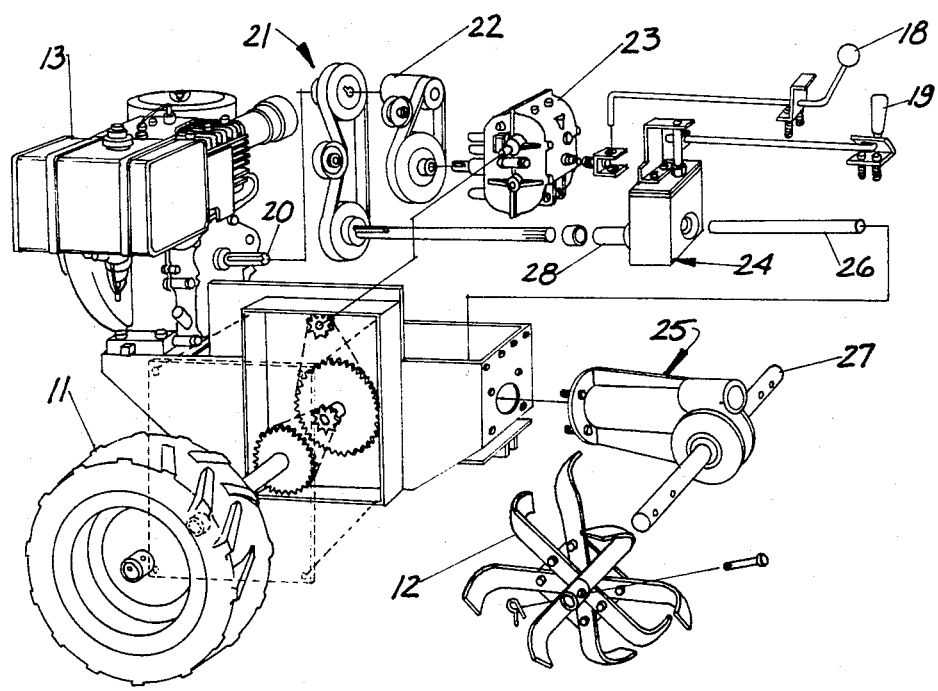
FIG. 2 is also a perspective view generally similar to that of FIG. 1 but with certain parts removed and certain others shown in exploded fashion.

Referring now to FIG. 2, the engine 13 is depicted as having a drive shaft 20 which has an output transmission drive generally indicated at 21 which is operatively connected to the transmission drive 22 for the traction wheel transmission assembly 23 and to the reversing transmission assembly 24 for the tiller tines 12. A conventional differential 25 translates axial rotation of the reversing transmission assembly output shaft 26, either direction, to corresponding axial rotation of the tine shaft 27 which is located at right angles to the output shaft 26.

Except for the tine transmission assembly 24 and its incorporation in the tiller 10, the mechanisms so far described may be considered conventional in this type of garden tiller. The reversing gear transmission assembly 24 of this invention is depicted in greater detail in FIGS. 3 through 6 and description of such transmission will now proceed with reference to those FIGS.

The output from the engine drive shaft 20 and output transmission drive 21 for the tines 12 (via the reversing gear transmission assembly 24, shaft 26, differential 25 and tine shaft 27) includes a splined shaft 28 which is received within the reversing transmission assembly 24. A gear 29 is internally splined so as to be slidable on the splined shaft 28. A shift spool 30, integral with the gear 29 (see FIG. 5), comprises part of the mechanism by which the gear 29 is slidably positioned on the splined shaft 28.

The output gear for the reversing transmission assembly is depicted at 31. This gear 31 is rotatable but not shiftable and is provided with three pins 32 fixed therein and receivable in corresponding holes 33 (see FIG. 5) provided in one face of the gear-spool arrangement 29, 30. When that arrangement is moved on the splined shaft 28 so as to engage the pins 32 within the holes 33, rotation of the splined shaft 28 and internally splined gear 29 (and spool 30) impart rotation to the output gear 31. It should be noted that while the engagement of internal splines on the gear-spool 29, 30 with exterior splines on the shaft 28 is not shown in detail, such splined arrangement is conventional and will be readily understood by those skilled in the art.

Figure 5:
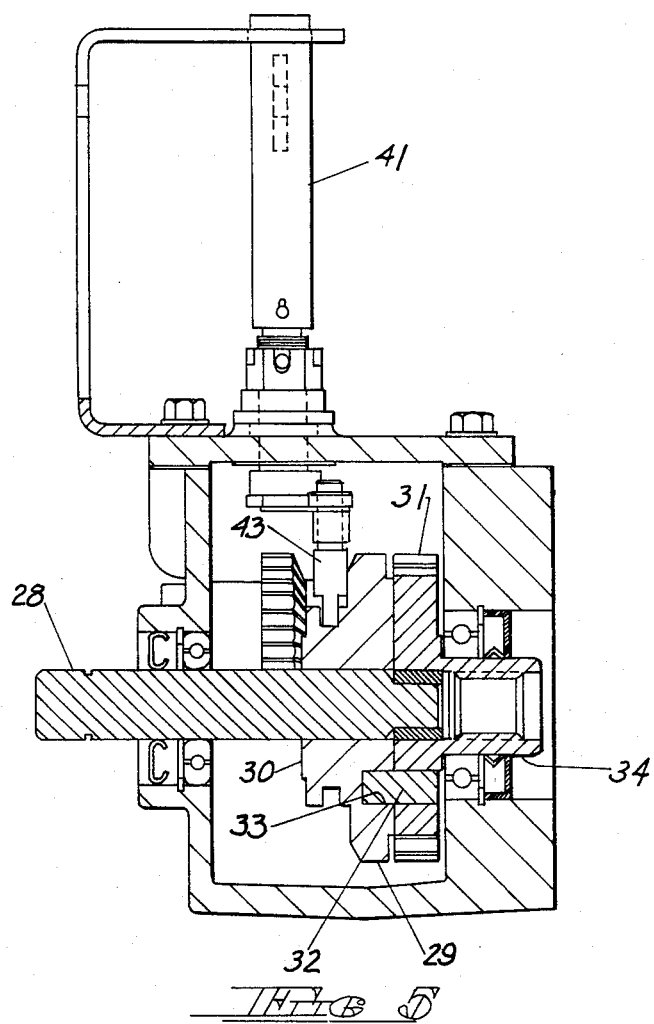
FIG. 5 is a section taken on the line 5—5 of FIG. 4.

When the parts so far described are in the full line position of FIGS. 3 through 5 the output shaft 26, which is drivingly connected within the gear extension 34 of the output gear 31 in a manner not specifically shown, will be rotatable with gear 31, and tine shaft 27 and tine 12 will be rotated in a given direction via the differential 25, this direction of tine movement being, for purposes of discussion, the same as that of the traction wheels 11.

Gear means to effect a reverse rotation of the gear 31 and shaft 26 are also located within the reversing transmission assembly 24. Such means includes a gear cluster comprised of gears 35r (right) and 35l (left) mounted on an axle 36 rotatably positioned in the assembly 24. Mounted beneath the gear 35r is a gear idler 37 fixed on an axle 38 rotatably mounted within bracket means 39. In its operative position within the transmission assembly 24 the gear idler 37 is always in mesh with gear 35r and with the output gear 31. Gear 35r does not directly mesh with gear 31 at any time.

When the various gears and mechanisms are in the full line position indicated in FIGS. 3 through 5, gear idler 37 is in meshing engagement with output gear 31 and such gear idler 37 is also in meshing engagement with cluster gear 35r. In this position of the parts, the drive is through the spline shaft 28 and sliding gear 29 to drive the output gear 31 via the pins 32 to effect a given rotation of the tine shaft 27 and tines 12, it being assumed for the purposes of this illustration that such rotation is in the same direction as that of the traction wheels 11. At this point it should also be noted that while but a single set of tines 12 is shown to be mounted on the tine shaft 27, in practice there will usually be four such sets, two on each side of the differential 25. During this rotation of the output gear 31 the gear cluster 35r and 35l simply rotates freely via the driving connection between the gear 31 and gear idler 37, this gear idler 37 also meshing with cluster gear 35r.

When the parts are shifted to the dotted line position of FIG. 3, as may be accomplished by engagement of a shift pin within the slot 30a of the spool portion 30 of the gear 29 in a manner to be described in greater detail shortly, the gear 29 is brought into engagement with cluster gear 35l. The drive is now through the splined shaft 28, gear 29, cluster gear 25l, cluster gear 35r, gear idler 37 and output gear 31. This combination of gears effects a direction of rotation of the output gear 31 which is opposite that imparted thereto when it is driven directly by the gear 29 through the pins 32.

Thus, when the gear 29 is slid on the shaft 28 to withdraw it from engagement with the pins 32 carried by the output gear 31, and the gear 29 is brought completely into engagement with cluster gear 35l, a direction of movement of the output gear 31 is achieved which in this illustration results in rotation of the tine shaft 27 and tines 12 in a direction opposite to that of the traction wheels 11.

The length of the pins 32 mounted in the output gear 31 is such that the gear 29 may be slid out of engagement with such pins and positioned short of engagement with cluster gear 35l whereby to obtain a neutral position wherein no rotation is imparted to the output gear 31 and, of course, none to the tine shaft 27 as well.

The means for shifting the slidable gear 29 on the splined shaft 28 include the member 19 and associated mechanisms 40, 41, 42 and finger member or shift pin 43 engaged within the slot 30a of the spool portion 30 of the slidable gear 29. The shift pin 43 is mounted on an end of an eccentric 44 which carries the member 42. When the operator moves the handle 19 to shift the member 40 along its axis so as to turn the member 41 and member 42, the eccentric 44 and pin 43 will shift the gear 29 on the splined shaft 28. Springs 45 are associated with the member 40 to keep pressure on these members 40-43 so that when the gear 29 is moved towards the output gear 31 to engage the pins 32 of the gear 31 within the holes 33 of the gear 29, there will be a bias such that when the pins and holes are aligned the members 29 and 31 will pop into engagement. Similarly, this spring biased arrangement 45 insures that when the gear 29 is slid on the splined shaft 28 sufficiently not only to remove the holes 33 from engagement with the pins 32 but also to move the gear 29 into engagement with the cluster gear 35l, such gears will pop together when the teeth become properly oriented.

In summary, with respect to the arrangement of gears within the reversing gear transmission assembly 24, output gear 31 and gear idler 37 are always in mesh, cluster gear 35r and gear idler 37 are also always in mesh, cluster gear 35r never directly contacts output gear 31, slidable gear 29 has three positions on the exterior splines of the splined shaft 28 via its internal splines (not shown), these positions including one wherein the gear 29 is drivingly connected to the output gear 31 via the pins 32 and holes 33, a neutral position wherein the gear 29 is withdrawn from contact with the pins 33 but out of contact with the cluster gear 35l, and a third position wherein the gear 29 drivingly engages the cluster gear 35l.

In the first position described the output gear 31 is rotated in a given direction via the splined shaft 28 and slidable gear 29, internal splines for the gear 29 engaging exterior splines of the shaft 28, and the pins 32 of the gear 31 being received within the holes 33 of the member 29. When the gear 29 is shifted to a position wherein the pins 32 no longer engage within the holes 33 and the gear 29 meshes with cluster gear 35l, then the output gear 31 is driven in a reverse direction via the splined shaft 28, gear 29, cluster gear 35l, cluster gear 35r and gear idler 37 (no longer idle). During the first direction of rotation of the output gear 31 as driven directly by the shaft 28 and gear 29 via the pins 32, the gear idler 37 and cluster gears 35l and 35r simply idle; during opposite rotation of the output gear 31 the idler gear 37 and cluster gears 35l and 35r become a direct part of the means for transmitting rotation (in an opposite direction) to the output gear 31.

It will be understood by those skilled in the art that modifications may be made in the structures and arrangements depicting the invention without departing from the basic teachings contained herein. And while the invention has been described in terms of particular structures and arrangements the invention is not to be limited thereto except insofar as these structures and arrangements are specifically included in the claims set forth below.

What I claim is:

1. A garden tiller comprising a chassis, a pair of traction wheels supporting said chassis, guide handles attached to said chassis by which an operator may guide said tiller, a tine shaft rotatably mounted in said chassis, earth working tines secured on said tine shaft, said tines being located between the operator and said traction wheels, an engine mounted on said chassis, first transmission means for driving said traction wheels in a given direction via said engine, second transmission means, an output shaft for said second transmission means, and a differential for driving said tines in said given direction via said second transmission means, said output shaft and said engine, said tiller being characterized by: said second transmission means including a reversing mechanism by means of which said tines may be driven in an opposite, reverse direction of said given direction while said traction wheels continue to be driven in said given direction; said second transmission means comprising a gear train including an output gear operatively connected to said output shaft, a slidable gear movable into rotational driving contact with said output gear to drive said output gear in said given direction, and gear means interposable between said slidable gear and said output gear to drive said output gear in said opposite, reverse direction; said gear train including a splined shaft on which said slidable gear is slidable and with which said slidable gear is rotatable, said splined shaft being rotatably driven by said engine and constituting a part of said second transmission means, said gear means including a gear idler in meshing engagement with said output gear, and a gear cluster mounted on a common shaft, said gear cluster including a first gear in meshing engagement with said gear idler and free of direct driving contact with said output gear and a second gear spaced therefrom, and shift means to slide said slidable gear out of driving contact with said output gear and into meshing driving contact with said second gear whereby to drive said output gear and output shaft in said opposite, reverse direction via said splined shaft, said slidable gear, said second gear, said first gear and said gear idler; and said rotational driving contact between said slidable gear and said output gear being achieved by a plurality of pins fixed in one of said slidable gear and said output gear and adapted to be received in mating holes fixed in the other of said slidable gear and said output gear.

2. The garden tiller of claim 1 in which said pins and holes are of such length and depth that when said slidable gear is shifted into meshing driving contact with said second gear said pins and holes are free of driving contact with one another.

3. The garden tiller of claim 2 in which the length and depth of said pins and holes, and the spacing between said first gear and said second gear of said gear cluster, are such that said slidable gear may be shifted to a neutral position out of said rotational driving contact with said output gear and short of said meshing driving contact with said second gear.

* * * * *